Nov. 28, 1950     E. L. MOORE     2,531,782
FRICTION ASSEMBLY AND METHOD OF MAKING THE SAME
Filed April 21, 1947
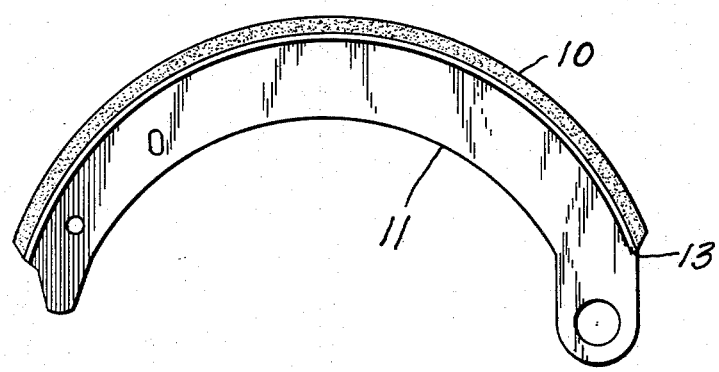
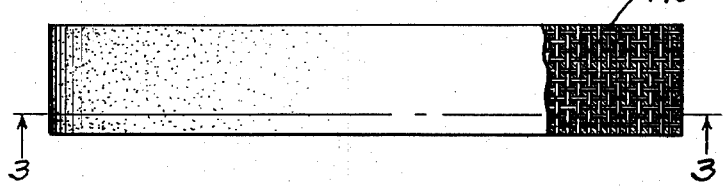
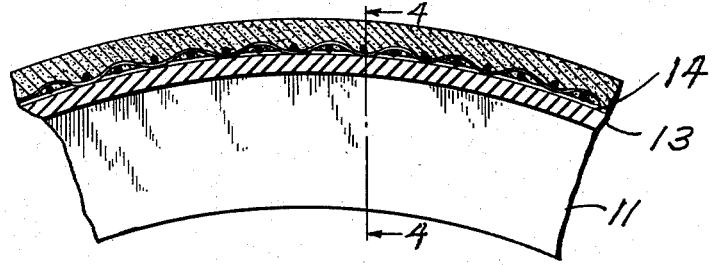
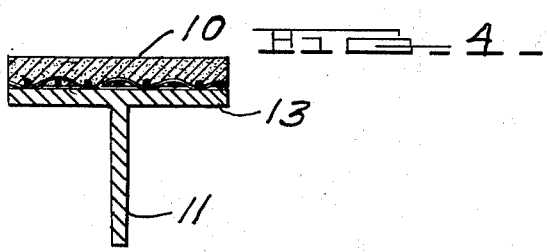
INVENTOR.
Emmett L. Moore
BY Adams + Bush
Attorneys Patented Nov. 28, 1950

2,531,782

UNITED STATES PATENT OFFICE 2,531,782

FRICTION ASSEMBLY AND METHOD OF MAKING THE SAME

Emmett L. Moore, Atlanta, Ga.

Application April 21, 1947, Serial No. 742,783

2 Claims. (Cl. 188—234)

This invention relates to improvements in friction assemblies for use in brakes, clutches and the like embodying linings or facings of friction material bonded to brake shoes, clutch elements or similar supporting members of friction assemblies. More particularly, it relates to brake or clutch assemblies and to an improved method of metallically bonding friction linings on the supporting members thereof.

One of the principal objects of the invention is to provide an improved and expeditious method of applying friction linings, having a metallic reinforcement, to brake or clutch elements by bonding them thereto with a thin layer of fusible metal firmly uniting the metallic reinforcement and the brake or clutch elements to which they are secured.

Another aim of the invention is to provide a simple and expeditious method of firmly bonding such friction linings to brake shoes or other elements to eliminate the necessity of using rivets or of applying synthetic bonding materials which are subject to breakage or cracking in service.

Still another aim of the invention is to provide an improved friction assembly of the character set forth, wherein the metal reinforcement of the friction material is partially ground or cut away to expose bonding surfaces, which are directly connected by fused metal to a brake shoe or other element of a friction assembly, whereby the reinforcing metal serves to anchor the friction lining firmly thereon.

Other objects and advantages of the invention will appear in the specification, when considered in connection with the illustrative embodiment thereof shown in the accompanying drawing, wherein:

Figure 1 is a side elevation of a brake shoe and a fused-on lining embodying the invention;

Fig. 2 is a top plan view of the lining shown in Fig. 1, a part being broken away to show wire mesh reinforcement in the lining;

Fig. 3 is a fragmentary sectional view on an enlarged scale, taken on the line 3—3 of Fig. 2; and Fig. 4 is a sectional view taken on the line 4—4 of Fig. 3.

It has heretofore been proposed to bond brake and clutch linings to their respective mountings or supporting elements by means of heat-hardening synthetic resins for the purpose of avoiding or eliminating the necessity of using rivets or other mechanical means for attaching such linings. Such linings are extremely difficult to remove and replace, particularly when the removal is to be carried out at ordinary service stations. The removal of such bonding material requires expensive operations of stripping and grinding which may result in damaging the brake shoes or other supporting members. In some intances, it is necessary to soak the shoe and lining in a caustic solution which again is expensive and time consuming.

The present invention eliminates the foregoing objections by employing a fused metal bond between the reinforced brake lining material and the supporting elements therefor, and, provides a novel method of expeditiously and economically applying the same.

In accordance with this invention, it is proposed to bond friction material, composed of the usual mixture of asbestos fibers and its bonding agents having a metallic reinforcement, such as wire mesh, to brake or clutch elements by using a very thin layer of solder, preferably composed of tin and lead, to provide a uniform and very strong metallic union between the brake or clutch elements and the wire mesh reinforcement.

Referring more particularly to the drawing, a brake-lining 10 is shown as being applied in accordance with the improved method to a conventional brake shoe 11 of the type used in expanding automobile brakes. The brake lining 10 is shown as having a wire mesh reinforcement 12, preferably of the general type shown in U. S. Patent No. 2,410,924 issued to Blume et al., November 12, 1946. In the present instance, the inner face of the lining is ground away to expose the wire mesh 12 and some of the wires, below their intersections, are also partially ground away to provide a substantial metallic surface or area for bonding against the outer face of the brake shoe flange 13. The wire in ordinary automobile brake linings is composed of wires of about 26 to 28 gauge. These exposed portions of the wires are preferably ground away to a depth of approximately one-third of their diameters.

The surface of the brake shoe is thoroughly cleaned and tinned with a suitable tinning material, well-known in the art. Also, the exposed partially ground-away wires are tinned and a thin strip of solder 14, preferably composed of equal parts of tin and lead and about 5 to 10 thousandths of an inch thick, is placed on the shoe flange and the lining is tightly gripped or clamped thereon. The lining may be clamped on the shoe flange in any convenient manner. Then, the shoe is heated to a temperature of from 475° F. to 500° F. to melt the solder. This is preferably accomplished by using the shoe as a resistance element and applying electric current to it at two or more points.

However, it is contemplated that the fusing heat may be applied by any suitable means without destroying or damaging the lining. Incidentally, the melting point of the solder is approximately 460° F. The brake shoe is therefore heated to a temperature slightly above that to insure fusing of the entire strip to the surface of the shoe flange and the surfaces of the exposed wires. This temperature, when applied for a short period, does no damage to the lining. The fused solder binds the wire mesh very firmly to all parts of the surface of the shoe flange and it has been found that such applied linings will withstand much greater torsional stresses than ordinary mechanically attached linings or those bonded with ordinary synthetic resins.

Obviously, the method is equally applicable to the renewal as well as to the initial installation of linings. They are easy to replace when they are worn out. It is only necessary to reheat the assembly sufficiently to melt the fused solder and the worn liner may be peeled off without the use of any special tools. The shoe flange does not require retinning for the application of a new liner, it being only necessary that the preground liner be tinned and a new soldering strip applied, as hereinbefore explained.

While the use of a tin-lead solder has been explained, it will be understood that other fusible metals having approximately the same melting point may be employed. It is also contemplated that other ratios of tin and lead may be employed. For example, solder composed of 35% tin and 65% lead, or 20% tin and 80% lead, are satisfactory for this purpose. The higher the quantity of lead in such solder compositions, the higher will be the melting temperature. The melting range of fusible alloys, applied to such linings, should be between about 400° F. and 500° F. It should be sufficiently high to withstand the maximum temperature of the brake under the most severe operating conditions. However, the melting temperature of such alloys should never exceed the temperature at which the lining material will be destroyed. It will be understood that ordinary asbestos linings act as a heat insulator and will prevent the rapid transmission of heat from a brake drum to a shoe or to a brake band. Moreover, brake shoes are subject to very rapid cooling, while the brakes are in service. Therefore, the melting temperature of the fusible metal may be much lower than the maximum temperature of a brake drum under severe service conditions.

Having thus described one illustrative embodiment of the invention and the best method of practicing the same, what is claimed is:

1. A brake assembly comprising a metal shoe; a brake lining of asbestos composition having a wire mesh reinforcement exposed on one side adjacent to the shoe; and a fused thin strip of lead-tin solder having a melting point between 400° F. and 500° F. bonding the reinforcement to the surface of the shoe throughout the extent of the lining.

2. The method of making a brake assembly embodying a metal shoe and an asbestos composition lining reinforced with wire mesh, which is characterized by removing a portion of the lining on one side to expose the inner surface of the wire mesh throughout the area of the lining; tinning the surface of the shoe and the exposed surface of the wire mesh; placing a thin strip of lead-tin solder having a melting point between 400° F. and 500° F. on the tinned surface of the shoe; clamping the lining on the shoe with the exposed surface of the wire mesh engaging the solder strip; and applying sufficient heat to the shoe to fuse the solder strip and bond the lining to the shoe throughout the exposed area of the wire mesh.

EMMETT L. MOORE.

REFERENCES CITED

The following references are of record in the file of this patent:

UNITED STATES PATENTS

| Number | Name | Date |
|---|---|---|
| 403,707 | Thomson | May 21, 1889 |
| 1,686,190 | Thompson | Oct. 2, 1928 |
| 1,728,172 | Bendix | Sept. 17, 1929 |
| 1,947,894 | Whitworth | Feb. 20, 1934 |
| 2,100,347 | Nanfeldt | Nov. 30, 1937 |
| 2,357,578 | Brownback | Sept. 5, 1944 |